US010907562B2

(12) United States Patent
Chia et al.

(10) Patent No.: US 10,907,562 B2
(45) Date of Patent: Feb. 2, 2021

(54) METHOD AND CONTROLLER FOR CONTROLLING A SWITCH VALVE

(71) Applicant: CPT Group GmbH, Hannover (DE)

(72) Inventors: Tet Kong Brian Chia, Regensburg (DE); Thomas Kraft, Obertraubling (DE); Andreas Bodensteiner, Lappersdorf (DE); Walter Sassler, Regensburg (DE)

(73) Assignee: VITESCO TECHNOLOGIES GMBH, Hannover (DE)

( * ) Notice: Subject to any disclaimer, the term of this patent is extended or adjusted under 35 U.S.C. 154(b) by 0 days.

(21) Appl. No.: 16/339,126

(22) PCT Filed: May 15, 2017

(86) PCT No.: PCT/EP2017/061640
§ 371 (c)(1),
(2) Date: Apr. 3, 2019

(87) PCT Pub. No.: WO2018/068905
PCT Pub. Date: Apr. 19, 2018

(65) Prior Publication Data
US 2019/0242322 A1    Aug. 8, 2019

(30) Foreign Application Priority Data

Oct. 12, 2016 (DE) .......................... 10 2016 219 890

(51) Int. Cl.
*F16K 31/02* (2006.01)
*F02D 41/20* (2006.01)
(Continued)

(52) U.S. Cl.
CPC ......... *F02D 41/20* (2013.01); *F02D 41/2464* (2013.01); *F02D 41/38* (2013.01);
(Continued)

(58) Field of Classification Search
CPC . G05D 16/2022; F02D 41/20; F02D 41/2464; F02D 41/38; F02D 41/3845;
(Continued)

(56) References Cited

U.S. PATENT DOCUMENTS 4,266,261 A * 5/1981 Streit ...................... F02D 41/20
361/154
5,924,435 A    7/1999 Wall et al. ........................ 137/1
(Continued)

FOREIGN PATENT DOCUMENTS

DE    695 17 387 T2    2/2001 ............. F02D 41/20
DE    102 01 453 A1    5/2003 ................ B60T 8/36
(Continued)

OTHER PUBLICATIONS

German Office Action, Application No. 10 2016 219 890.4, 5 pages, dated Feb. 26, 2017.
(Continued)

*Primary Examiner* — Minh Q Le
(74) *Attorney, Agent, or Firm* — Slayden Grubert Beard PLLC

(57) ABSTRACT

Various embodiments include a method for controlling a pressure dissipation valve comprising a closure element, a spring applying a spring force urging the closure element toward the closed position, and an electromagnetic actuator responding to an applied voltage to urge the closure element to an open position. The method may include: applying a constant voltage until the closure element begins motion counter to the spring force; immediately ending the voltage upon the beginning of motion; thereafter, applying a pulsed voltage to the actuator to induce a substantially constant holding-open current intensity; maintaining the pulsed voltage for a predetermined duration to hold the closure element open; and interrupting the application of voltage after the
(Continued)

predetermined duration, wherein the closure element moves into the closed position as a result of the spring force.

8 Claims, 3 Drawing Sheets

(51) Int. Cl.
| | |
|---|---|
| *F02M 63/00* | (2006.01) |
| *H01F 7/18* | (2006.01) |
| *F02D 41/38* | (2006.01) |
| *F02D 41/24* | (2006.01) |
| *G05D 16/20* | (2006.01) |
| *H01F 7/16* | (2006.01) |

(52) U.S. Cl.
CPC ..... *F02D 41/3845* (2013.01); *F02D 41/3863* (2013.01); *F02M 63/0052* (2013.01); *G05D 16/2022* (2019.01); *H01F 7/1623* (2013.01); *H01F 7/1805* (2013.01); *F02D 2041/2003* (2013.01); *F02D 2041/2013* (2013.01); *F02D 2041/2034* (2013.01); *F02D 2041/2037* (2013.01); *F02D 2041/2041* (2013.01); *F02D 2041/2048* (2013.01); *F02D 2041/2051* (2013.01); *F02D 2041/2055* (2013.01); *F02D 2041/2058* (2013.01); *F02D 2041/2062* (2013.01); *F02M 2200/09* (2013.01)

(58) Field of Classification Search
CPC ......... F02D 41/3863; F02D 2041/2003; F02D 2041/2013; F02D 2041/2034; F02D 2041/2037; F02D 2041/2041; F02D 2041/2048; F02D 2041/2051; F02D 2041/2055; F02D 2041/2058; F02D 2041/2062; F02M 63/0052; F02M 2200/09; H01F 7/1623; H01F 7/1805
USPC ........................................................ 137/487.5
See application file for complete search history.

(56) References Cited

U.S. PATENT DOCUMENTS

| | | | | |
|---|---|---|---|---|
| 5,959,825 | A | 9/1999 | Harcombe | 361/154 |
| 6,832,601 | B2* | 12/2004 | Watanabe | F02D 41/20 |
| | | | | 123/480 |
| 6,964,262 | B2* | 11/2005 | Hayakawa | F02D 41/0087 |
| | | | | 123/179.16 |
| 7,013,876 | B1 | 3/2006 | Puckett et al. | 123/490 |
| 9,121,360 | B2 | 9/2015 | Richter et al. | |
| 9,261,038 | B2* | 2/2016 | Nishida | F02D 41/20 |
| 10,280,867 | B2* | 5/2019 | Anetsberger | F02D 41/3863 |
| 2001/0023686 | A1* | 9/2001 | Okamoto | F02D 41/20 |
| | | | | 123/490 |
| 2008/0017172 | A1* | 1/2008 | Kojima | F02D 41/20 |
| | | | | 123/478 |
| 2008/0276907 | A1* | 11/2008 | Abe | F02M 51/0685 |
| | | | | 123/472 |
| 2009/0177369 | A1* | 7/2009 | Miyake | F02D 41/20 |
| | | | | 701/105 |
| 2011/0251778 | A1* | 10/2011 | Saito | F02D 41/021 |
| | | | | 701/103 |
| 2012/0185147 | A1 | 7/2012 | Beer | 701/102 |
| 2012/0216783 | A1* | 8/2012 | Kusakabe | F02D 41/20 |
| | | | | 123/490 |
| 2012/0318883 | A1* | 12/2012 | Kusakabe | F02M 45/12 |
| | | | | 239/1 |
| 2013/0139791 | A1* | 6/2013 | Kusakabe | F02D 41/20 |
| | | | | 123/478 |
| 2014/0216419 | A1 | 8/2014 | Wirkowski et al. | 123/506 |
| 2014/0238354 | A1* | 8/2014 | Imai | F02M 51/005 |
| | | | | 123/478 |
| 2014/0240886 | A1* | 8/2014 | Itaya | F02D 41/20 |
| | | | | 361/178 |
| 2015/0377176 | A1* | 12/2015 | Hatanaka | F02M 51/061 |
| | | | | 137/554 |
| 2016/0047330 | A1* | 2/2016 | Mukaihara | F02D 41/2467 |
| | | | | 123/472 |
| 2016/0076498 | A1* | 3/2016 | Aono | F02D 41/2467 |
| | | | | 123/490 |
| 2016/0237935 | A1* | 8/2016 | Tanaka | F02D 41/247 |
| 2017/0218876 | A1* | 8/2017 | Kusakabe | F02D 41/20 |
| 2017/0306907 | A1* | 10/2017 | Namuduri | H02K 33/16 |
| 2018/0142643 | A1* | 5/2018 | Fukuda | F02D 41/20 |
| 2018/0156147 | A1* | 6/2018 | Shi | F02D 41/247 |
| 2018/0306137 | A1* | 10/2018 | Yamaoka | F02D 45/00 |
| 2019/0024601 | A1* | 1/2019 | Miyamoto | F02D 41/20 |
| 2019/0170078 | A1* | 6/2019 | Nishimura | F02D 41/20 |
| 2020/0088123 | A1* | 3/2020 | Itaba | F02D 41/20 |

FOREIGN PATENT DOCUMENTS

| | | | | |
|---|---|---|---|---|
| DE | 695 29 352 T2 | 8/2003 | ............ | F02D 41/20 |
| DE | 11 2006 000 782 T5 | 2/2008 | ............ | F02D 41/20 |
| DE | 10 2009 043 124 B4 | 6/2011 | ............ | F02D 41/00 |
| DE | 10 2011 075 271 A1 | 11/2012 | ............ | F02D 41/20 |
| DE | 10 2013 209 070 A1 | 11/2014 | ............ | H01F 7/18 |
| EP | 2 554 825 A2 | 2/2013 | ............ | F02D 41/20 |
| JP | 2002-030972 A | 1/2002 | ............ | F02D 41/20 |
| JP | 2010270713 A | 12/2010 | ............ | F02D 41/20 |
| JP | 2013050065 A | 3/2013 | ............ | F02D 41/20 |
| JP | 2015021428 A | 2/2015 | ............ | F02M 59/36 |
| KR | 20110106847 A | 9/2011 | ............ | F02D 41/20 |
| WO | 2018/068905 A1 | 4/2018 | ............ | F02D 41/20 |

OTHER PUBLICATIONS

International Search Report and Written Opinion, Application No. PCT/EP2017/061640, 22 pages, dated Jul. 14, 2017.
Korean Office Action, Application No. 2020024866273, 8 pages, dated Apr. 6, 2020.

* cited by examiner

METHOD AND CONTROLLER FOR CONTROLLING A SWITCH VALVE

CROSS-REFERENCE TO RELATED APPLICATIONS

This application is a U.S. National Stage Application of International Application No. PCT/EP2017/061640 filed May 15, 2017, which designates the United States of America, and claims priority to DE Application No. 10 2016 219 890.4 filed Oct. 12, 2016, the contents of which are hereby incorporated by reference in their entirety.

TECHNICAL FIELD

The present disclosure relates to valves. Various embodiments may include methods for controlling a switching valve and/or control devices for controlling a switching valve of said type.

BACKGROUND

In fuel injection systems, so-called active valves, which are commonly in the form of switching valves, are arranged at various locations. These switching valves can be actively opened and closed by means of an actuator, whereby targeted regulation of a fuel flow can be attained. For example, a switching valve of said type may be arranged as a pressure dissipation valve on a high-pressure side of the fuel injection system in order to be able to actively regulate a system pressure in the fuel injection system.

Here, it is known for the fuel pressure to be regulated preferably to a desired setpoint pressure. Here, a part of the regulation of the system pressure is realized by means of activation of a metering unit on a low-pressure side of the fuel injection system in accordance with demand. Here, the pressure build-up and dissipation is performed with segment synchronicity in relation to an injection segment or pump segment of a high-pressure fuel pump in the fuel injection system, in accordance with the transmission ratio of the high-pressure fuel pump in relation to the driving motor. The actual pressure prevailing on the high-pressure side of the fuel injection system is detected by means of a high-pressure sensor and transmitted to a control device. In order to attain the desired setpoint pressure on the high-pressure side, the system pressure is actively dissipated by means of a so-called digital pressure dissipation valve. This pressure dissipation valve is normally formed as a switching valve and thus as an active valve, functions similarly to an injector, and thus discharges a defined fuel quantity out of the high-pressure side in order to dissipate the fuel pressure. Here, during opening and closing, the active pressure dissipation valve generates a noise, which has hitherto not been given consideration.

SUMMARY

The teachings of the present disclosure describe methods and control devices for controlling a switching valve, with which quieter operation of the pressure dissipation valve is possible. For example, some embodiments include a method for controlling a switching valve (16), in particular a pressure dissipation valve (14) for a fuel injection system (10), wherein the switching valve (16) has: a closure element (36) which is movable between a first end position (EP1), in which it closes a valve opening (24), and a second end position (EP2), in which it at least partially opens up the valve opening (24), a spring (38) which subjects the closure element (36) to a spring force ($F_F$) acting in the direction of the first end position (EP1), an electromagnetic actuator (22) which, when a voltage (U) is applied thereto, subjects the closure element (36) to an actuator force ($F_A$), acting oppositely to the spring force ($F_F$), in the direction of the second end position (EP2), wherein the method has the following steps: applying a constant voltage ($U_{C1}$) to the actuator (22) in order to induce an opening current pulse ($I_{öff}$) until such time as the closure element (36) is set in motion counter to the spring force ($F_F$), and then immediately ending the application of the constant voltage ($U_{C1}$) and applying a pulsed voltage ($U_{Puls1}$) to the actuator (22) in order to induce a substantially constant holding-open current intensity ($I_{off}$), maintaining the pulsed voltage ($U_{Puls1}$) and thus the holding-open current intensity ($I_{off}$) for a predetermined duration ($\Delta t$) in order to hold the closure element (36) in the second end position (EP2), and interrupting the application of voltage after the predetermined duration ($\Delta t$), such that the closure element (36) is moved into the first end position (EP1) by the spring force ($F_F$).

In some embodiments, the actuator force ($F_A$) acting on the closure element (36) owing to the induced current intensity (I) of the opening current pulse ($I_{öff}$) is greater in terms of magnitude than the spring force ($F_F$) of the spring (38), and/or in that the actuator force ($F_A$) acting on the closure element (36) owing to the induced holding-open current intensity ($I_{off}$) substantially corresponds in terms of magnitude to the spring force ($F_F$).

In some embodiments, the application of voltage is interrupted until such time as an induced current intensity (I) of I=0 is attained.

In some embodiments, during the movement of the closure element (36) into the first end position (EP1) after the interruption of the application of voltage, a constant voltage ($U_{C2}$) is applied to the actuator (22) in order to induce a braking current intensity ($I_{Brems}$), wherein a duration ($\Delta t$) of the application of voltage for inducing the braking current intensity ($I_{Brems}$) is shorter than the duration ($\Delta t$) of the application of voltage for inducing the opening current pulse ($I_{öff}$).

In some embodiments, the actuator force ($F_A$) that acts on the closure element (36) as a result of the induced braking current intensity ($I_{Brems}$) is lower than the spring force ($F_F$) of the spring (38).

In some embodiments, the method includes ending the application of the constant voltage ($U_{C2}$), and then immediately applying a pulsed voltage ($U_{Puls2}$) to the actuator (22) until such time as the closure element (36) is situated in the first end position (EP1), and then ending the application of voltage.

As another example, some embodiments include a control device (40) for controlling a switching valve (16), in particular a pressure dissipation valve (14) for a fuel injection system (10), wherein the control device (40) is configured for carrying out a method as described above.

BRIEF DESCRIPTION OF THE DRAWINGS

An example embodiment of the teachings herein is explained in more detail below on the basis of the appended drawings, in which.

DETAILED DESCRIPTION

Figure 1:
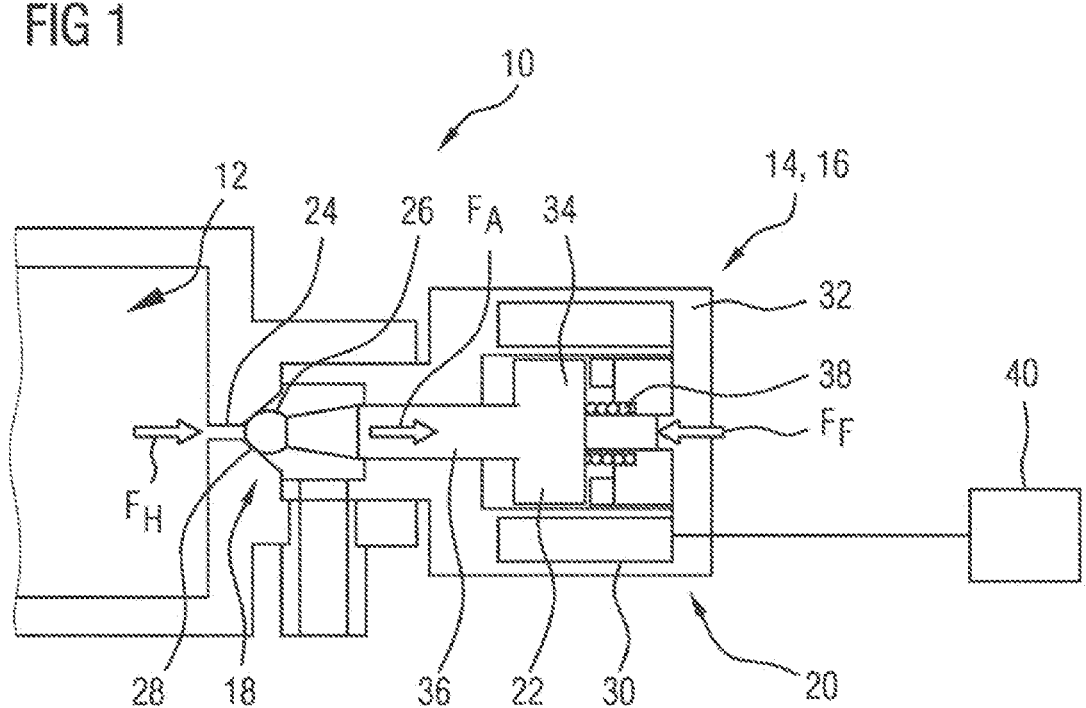
FIG. 1 is a schematic sectional illustration of a switching valve which acts as a pressure dissipation valve for dissipating a pressure from a high-pressure side in a fuel injection system.

In some embodiments, a switching valve, in particular a pressure dissipation valve for a fuel injection system, may include a closure element which is movable between a first end position, in which it closes a valve opening, and a second end position, in which it at least partially opens up the valve opening, a spring which subjects the closure element to a spring force acting in the direction of the first end position, and an electromagnetic actuator which, when a voltage is applied thereto, subjects the closure element to an actuator force, acting oppositely to the spring force, in the direction of the second end position. In some embodiments, the actuator comprises a coil to which a voltage can be applied from an external source. In some embodiments, the application of voltage results in an induced current intensity, which effects the actuator force.

In some embodiments, a method for controlling a switching valve of said type, includes applying a constant voltage, which induces an opening current pulse, to the actuator until such time as the current intensity of the opening current pulse reaches a predefined maximum. Said maximum is defined so as to correspond to a point at which the closure element is set in motion counter to the spring force. The predetermined maximum may for example be determined by means of a calibration measurement, in which that induced current intensity at which the movement of the closure element begins is detected.

When the predefined maximum of the current intensity is attained, the application of the constant voltage is immediately ended, and a pulsed voltage is instead applied to the actuator. Said pulsed voltage induces a substantially constant holding-open current intensity. The pulses (that is to say the durations of each individual pulse and the time interval between two successive pulses) are selected here such that the induced holding-open current intensity may be lower than the predefined maximum of the current intensity. The pulsed voltage and thus the holding-open current intensity are maintained for a predetermined duration in order to hold the closure element in the second end position.

Subsequently, the application of voltage is interrupted after the predetermined duration, such that the closure element is moved into the first end position by the spring force. The switching valve may comprise a switching valve which is closed when electrically deenergized, that is to say the opening current pulse serves to move the closure element into an open position.

It has hitherto been known for voltage to be applied to the actuator until such time as the closure element has impacted in the second end position, which is referred to as so-called peak time, and for a holding current induced by a pulsed voltage to subsequently be applied to the pressure dissipation valve, which has been maintained until the end of the desired open state. In some embodiments, in contrast, the application of voltage to the actuator in order to induce the opening current pulse may be performed only until such time as the current intensity reaches the defined maximum. This is the point at which the closure element begins to move away from the first end position in the direction of the second end position. The constant voltage for inducing the opening current pulse is applied to the actuator only until exactly this point, in order to achieve that the closure element lifts off from the first end position. For the further movement of the closure element in the direction of the second end position, such a large induced current intensity is no longer required, for which reason the voltage acts in merely pulsed and not constant form on the actuator in order to thus attain a reduced induced current intensity, which is just sufficient to achieve that the closure element can just be held open when it has reached the second end position.

The induced current intensity required to hold the closure element in the second end position is lower than the induced current intensity required to set the closure element in motion. The induced holding-open current intensity may be lower than the induced current intensity at the defined maximum, that is to say the point at which the closure element lifts off from a seat. By means of this manner of voltage application, the peak time is reduced in relation to previously, and the application of voltage to the actuator is not performed until the impacting of the closure element in the second end position. By means of the spring force of the spring that opposes the actuator force, the closure element is braked and impacts at a reduced speed, resulting in reduced noise during the opening of the closure element.

The actuator force acting on the closure element owing to the induced current intensity of the opening current pulse may be greater in terms of magnitude than the spring force of the spring. It is thus possible for the spring force of the spring to be overcome, and for the closure element to be set in motion. In some embodiments, the actuator force acting on the closure element owing to the induced holding-open current intensity substantially corresponds in terms of magnitude to the spring force. In some embodiments, the induced holding-open current intensity is slightly greater than the spring force of the spring in order to thus make it possible, under optimum energy conditions, for the closure element to be held in the second end position counter to the acting spring force.

The induced holding-open current intensity is in this case may be kept constant for a predetermined duration. The predetermined duration for which the holding-open current intensity should be maintained at the actuator is determined in advance and is dependent on the fuel quantity that is to be discharged from the high-pressure side. The more fuel is to be discharged, the longer is the time duration for which the closure element must be held in the second end position.

In some embodiments, the application of voltage to the electromagnetic actuator is interrupted until such time as an induced current intensity of I=0 is attained. It is however also possible for the application of voltage to be interrupted for a shorter time period, such that the induced current intensity cannot be depleted entirely to I=0. The predetermined duration in which the closure element is held in the second end position corresponds to a so-called holding phase, which is required for as long as the pressure dissipation by means of the pressure dissipation valve is necessary.

If the application of voltage is then interrupted after this predetermined duration, the closure element is forced back into the initial position, that is to say the first end position, by the spring force of the spring. During the movement of the closure element into the first end position after the interruption of the application of voltage, in some embodiments a constant voltage is applied to the actuator in order to induce a braking current intensity. Here, the duration of the application of voltage is shorter than the duration for inducing the opening current pulse.

This braking current intensity thus constitutes a pulse that is appended to the activation pulse itself and which brakes the closure element before it impacts in the first end position. As a result of the thus reduced speed, the noise during the closing of the switching valve is reduced. Since the braking current intensity does not need to completely overcome the spring force of the spring but must merely act so as to reduce said spring force, the braking current intensity may be lower than the holding-open current intensity, which is effected by virtue of the constant voltage acting for a shorter time. This is because the voltage applied to the coil is not variable in terms of its magnitude. The induced current intensity in the actuator is consequently influenced by the duration of the application of voltage and the form (constant or pulsed).

The actuator force that acts on the closure element owing to the induced braking current intensity may be lower than the spring force of the spring. In some embodiments, after the desired induced braking current intensity has been attained, the application of the constant voltage is ended and a pulsed voltage is applied to the actuator until such time as the closure element is situated fully in the first end position. The application of voltage is then ended completely. It is however also possible for the pulsed voltage to be maintained for even longer, beyond the closing time of the closure element.

In some embodiments, the application of voltage to the actuator in order to induce the breaking current intensity is performed during the movement of the closure element and not only after the closure element has already reached the first end position again. Since the spring force of the spring is known, it is also known what time the closure element requires to return from the second end position into the first end position after a complete withdrawal of the electrical energization. This duration may for example be stored in a corresponding characteristic map. The activation of the actuator is then performed during this already-known duration, such that a braking action acts on the closure element during this time.

In some embodiments, a control device for controlling a switching valve, in particular a pressure dissipation valve for a fuel injection system, is designed such that it can carry out the method described above. For this purpose, the control device has, in particular, an output device for outputting a voltage, specifically such that a current intensity induced by the voltage is variable. Furthermore, the control device comprises a maximum-value detection device, by means of which the control device is capable of identifying when the defined maximum in the current intensity of the opening current pulse is present, and thus of detecting when the closure element lifts off from the first end position.

Additionally, the control device comprises a duration-determining device in order to determine the predetermined duration required in order to hold the closure element in the second end position, that is to say in the open position, in order to be able to discharge the desired fuel quantity from the high-pressure side. Furthermore, the control device comprises a determining device by means of which it is possible to determine whether the voltage has been completely shut off, such that the induced current intensity can be depleted for example to a value of I=0. Furthermore, in the control device, there is stored a characteristic map which specifies, on the basis of the known spring force of the spring, the duration required by the closure element to pass from the second end position into the first in position without electrical energization.

FIG. 1 shows a schematic longitudinal sectional illustration of a subregion of a fuel injection system 10 on a high-pressure side 12 at which a pressure dissipation valve 14 in the form of a switching valve 16 is arranged for the purposes of dissipating a fuel pressure that prevails in the high-pressure side 12. The pressure dissipation valve 14 has a valve region 18 and an actuator region 20 with an actuator 22. In the valve region 18, a valve opening 24 to the high-pressure side 12 of the fuel injection system 10 is closed off by interaction of a valve ball 26 with a valve seat 28. The actuator region 20 has the electromagnetic actuator 22, which comprises a coil 30, a pole piece 32 and an armature 34. Here, the armature 34 is formed integrally with a closure element 36, which interacts with the valve ball 26. In some embodiments, there is a spring 38, which is in the form of a compression spring and which is arranged between pole piece 32 and armature 34.

It is pointed out that FIG. 1 schematically shows an example of a switching valve 16 which, in this case, is in the form of a switching valve 16 which is closed when electrically deenergized. In particular, the actuator 22 and the connection between armature 34, closure element 36 and sealing element, which in this case is in the form of a valve ball 26, may also be configured differently.

The mode of operation of the pressure dissipation valve 14 is as follows:

From the high-pressure side 12, a hydraulic force $F_H$ acts on the valve ball 26, and would normally push the valve ball 26 away from the valve seat 28. However, from the opposite side, the spring 38 acts with a spring force $F_F$ on the armature 34 and thus simultaneously on the closure element 36 and the valve ball 26, such that the valve ball 26 does not lift off from its valve seat 28 but rather remains in its closed position. Said closed position constitutes the first end position EP1 of the closure element 36.

If a voltage U is now applied to the coil 30, this induces a current intensity I, the armature 34 is attracted by the pole piece 32, and the spring force $F_F$ of the spring 38 is overcome, that is to say an actuator force $F_A$ of the actuator 22 becomes greater than a spring force $F_F$ of the spring 38. As a result, the armature 34, the closure element 36 and the valve ball 26 move away from the valve seat 28 and at least partially open up the valve opening 24. When the spring force $F_F$ has been completely overcome, then the closure element 36 is situated in the second end position EP2.

The activation of the coil 30, by means of which the movement of the closure element 36 and thus of the valve ball 26 in the direction of the second end position EP2 can be effected, is realized by means of a control device 40.

Figure 2:
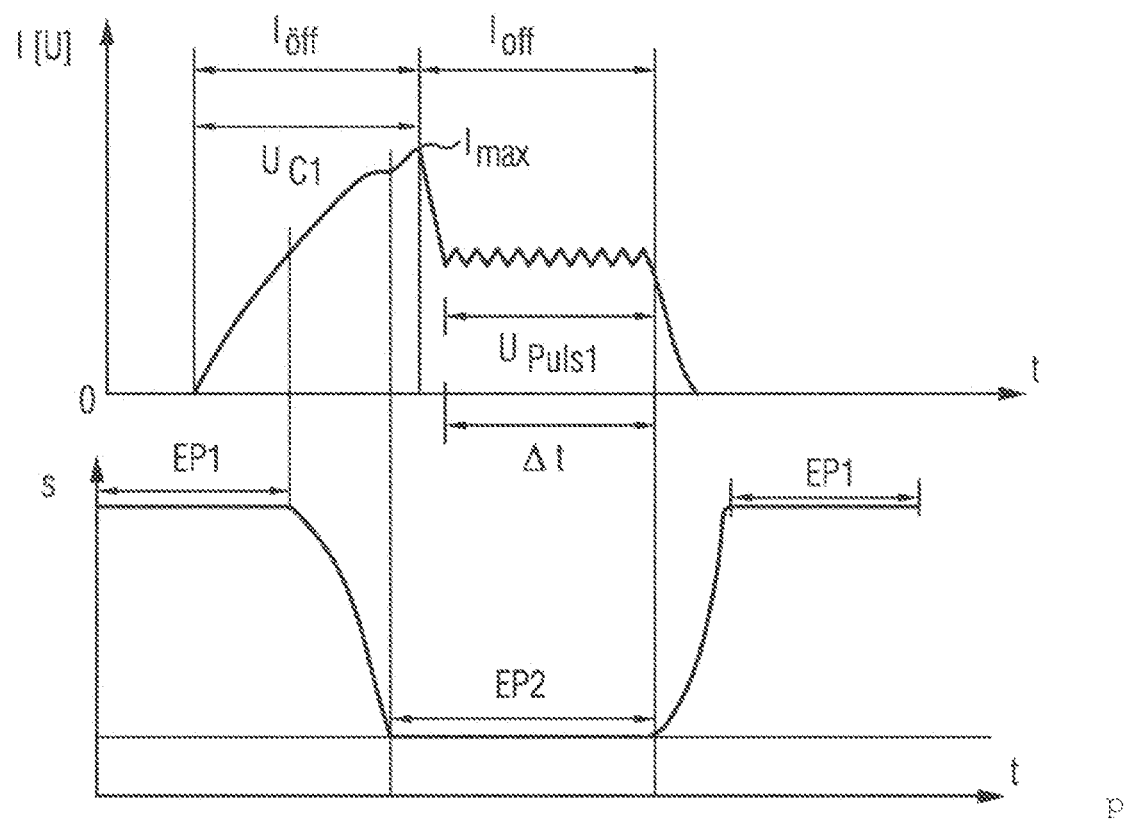
FIG. 2 shows schematic diagrams illustrating the relationship between a current-time activation profile of the switching valve from FIG. 1 and a travel-time profile, dependent thereon, of a closure element of the switching valve as is known from the prior art.

FIG. 2 schematically shows the relationship between a current-time activation profile and a travel-time profile, which constitute an activation profile for the coil 30 such as is known from the prior art. Here, in the upper diagram, the current I that is induced in the actuator 22 as a result of a voltage U being applied to the coil 30 is plotted versus the time t. In the lower diagram, the travel s covered by the closure element 36 when voltage is applied to the coil 30 is plotted likewise versus the time t, wherein the time units of the diagrams overlap.

In the upper diagram, it can be seen that, by virtue of a constant voltage $U_{C1}$ being applied, the current intensity I of an opening current pulse $I_{öff}$ induced by the voltage U initially increases up to a plateau. When compared with the lower diagram, it can be seen that this plateau region is the region where the closure element 36 ends its movement, that is to say impacts in the second end position EP2. Shortly after the plateau region, a current peak $I_{max}$ occurs in the current-time activation profile, which is caused by the closure element 36 having impacted in the second end position EP2. The current intensity I subsequently drastically falls and remains at a constant holding-open current intensity $I_{off}$, in the case of which a pulsed voltage $U_{Puls1}$ is applied to the coil 30.

This corresponds to a holding phase, in which the closure element 36 is held in the second end position EP2 in order to thus hold the pressure dissipation valve 14 open and permit a discharge of fuel out of the high-pressure side 12. This holding phase is maintained for a predetermined duration $\Delta t$ which has been determined in advance from a difference between setpoint pressure desired on the high-pressure side 12 and the actual pressure prevailing on the high-pressure side 12. If the setpoint pressure value has been reached, the application of voltage is ended completely, and the induced current intensity I is depleted to a value of I=0. Here, the spring force $F_F$ of the spring 38 then prevails again, such that the closure element 36 is pushed back into the first end position EP1.

Figure 3:
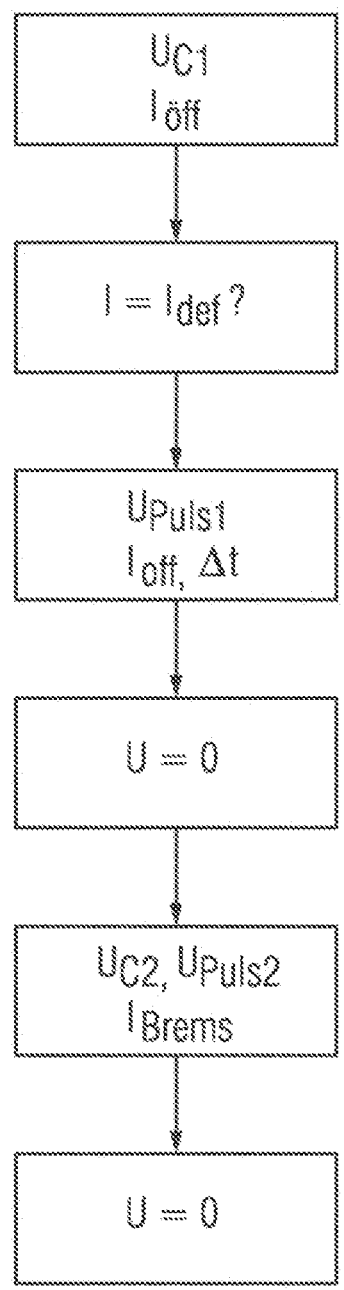
FIG. 3 shows a schematic flow diagram illustrating individual steps for carrying out a method for controlling the switching valve from FIG. 1 incorporating teachings of the present disclosure.

Both at the time at which the closure element 36 impacts in the second end position EP2 and at the time at which the closure element 36 impacts in the first end position EP1 owing to the spring force $F_F$, intense noises are generated owing to the impact impetus. It is therefore now proposed, in order to reduce these noises, that the activation strategy shown in FIG. 2 and known from the prior art be modified, as is schematically illustrated in the flow diagram in FIG. 3.

Here, firstly, a constant voltage $U_{C1}$ is applied to the coil 30 such that an opening current pulse $I_{öff}$ is induced. In the next step, it is determined whether the induced current intensity I is situated at a defined maximum $I_{def}$. This maximum $I_{def}$ has been determined in advance in a calibration measurement and corresponds to the time t at which the closure element 36 lifts off from the first end position EP1. If this is the case, the application of the constant voltage $U_{C1}$ is ended, and a switch is made to an application of a pulsed voltage $U_{Puls1}$, which induces a holding-open current intensity $I_{off}$, specifically for a predetermined duration $\Delta t$, which has been determined in advance.

After this predetermined duration $\Delta t$ has elapsed, the application of voltage to the actuator 22 is interrupted until such time as the induced current intensity I has reached, for example, a value of I=0. It is however not necessary to wait for as long as this, and the application of voltage may be restarted before the induced current intensity I has been fully depleted. Subsequently, still during the movement of the closure element 36 back into the first end position EP1 effected by the spring force $F_F$ of the spring 38, a braking current intensity $I_{Brems}$ is induced by virtue of a constant voltage $U_{C2}$ being applied to the actuator 22, wherein the actuator force $F_A$ that acts on the closure element 36 as a result of this braking current intensity $I_{Brems}$ counteracts the spring force $F_F$ and thus brakes the movement speed of the closure element 36. The voltage U is switched from the constant voltage $U_{C2}$ to a pulsed voltage $U_{Puls2}$ and is maintained until such time as the closure element 36 has reached the first end position EP1. Subsequently, the application of voltage to the actuator 22 is ended completely, until the current intensity I has assumed a value of I=0 again.

Figure 4:
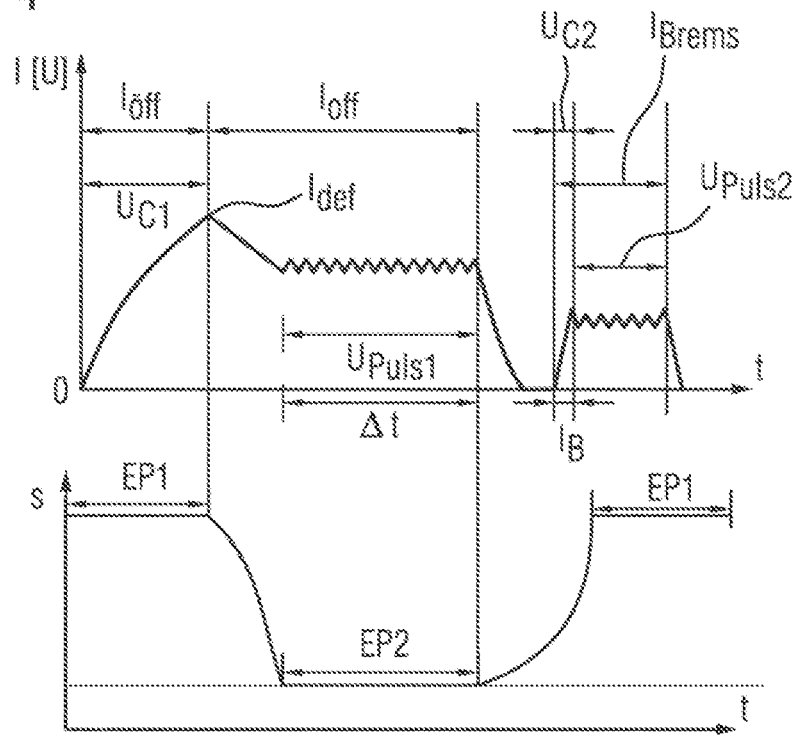
FIG. 4 shows schematic diagrams illustrating the relationship between a current-time activation profile of the switching valve from FIG. 1 and a travel-time profile, dependent thereon, of a closure element of the switching valve.

This activation strategy is schematically shown in FIG. 4. In FIG. 4, the upper diagram again shows a current-time activation profile, which illustrates the activation current intensity I induced by the application of voltage versus the time t, whereas the lower diagram illustrates a travel-time profile, which shows how the closure element 36 moves as a function of the activation profile in the upper diagram.

It can be seen that the application of the constant voltage $U_{C1}$ in order to induce the opening current pulse $I_{öff}$ is not performed, as has previously been known, until such time as a current peak $I_{max}$ can be detected, that is to say until the closure element 36 has impacted in the second end position EP2, that, instead, already when the defined maximum $I_{def}$ of the induced current intensity I is reached, and thus at the moment at which the closure element 36 is set in motion, the current intensity I is lowered by virtue of the application of constant voltage being ended, and the holding-open current intensity $I_{off}$ being induced by application of a pulsed voltage $U_{Puls1}$. This is maintained for a duration $\Delta t$ which corresponds to a predetermined duration $\Delta t$ which has been determined in advance in order to discharge the pressure as desired from the high-pressure side 12.

At the end of this predetermined duration $\Delta t$, the application of voltage is interrupted, for example until such time as the induced current intensity I can be depleted to a value of I=0. By contrast to the prior art, however, the activation does not end here, it rather being the case that the braking current intensity $I_{Brems}$ is induced by virtue of a constant voltage $U_{C2}$ being applied again, such that, even during the closing movement of the closure element 36 in the direction of the first end position EP1, an actuator force $F_A$ acts counter to the spring force $F_F$ of the spring 38. By means of the activation profile shown in FIG. 4, the closure element 36 is braked both in the opening phase and in the closing phase, such that the impact in the two end positions EP1, EP2 is less pronounced, and the generation of noise can be reduced.

Figure 5:
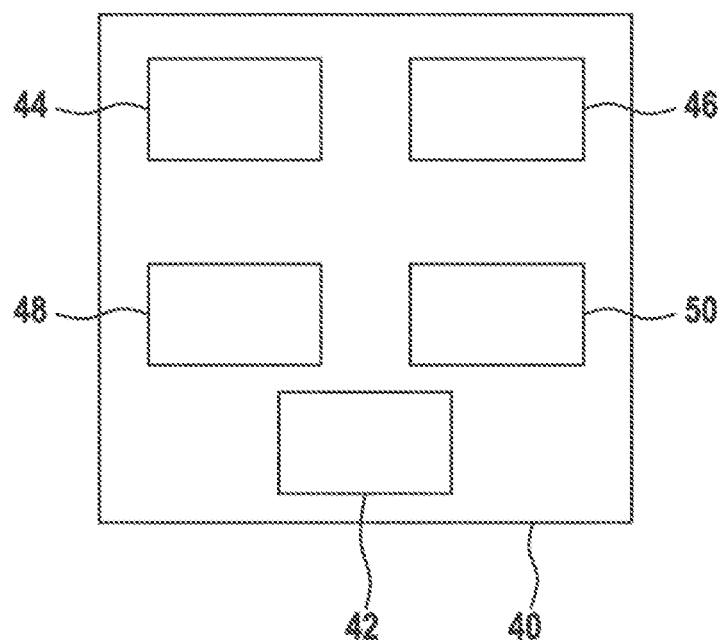
FIG. 5 shows a schematic block diagram showing a control device which can carry out the method as per FIG. 3.

FIG. 5 shows a block diagram illustrating the control device 40 from FIG. 1, which is suitable for carrying out the activation method described above. For this purpose, the control device 40 has an output device 42 by means of which the desired voltage U for inducing the respective current intensity I can be applied to the coil 30. Additionally, a maximum-value detection device 44 is provided which can detect when the opening current pulse $I_{off}$ is at the defined maximum $I_{def}$, that is to say when the closure element 36 is set in motion. Furthermore, the control device 40 comprises a duration determining device 46 which determines the length of time for which the closure element 36 must be held in the second end position EP2, that is to say in the open position, in order to be able to achieve the desired pressure dissipation on the high-pressure side 12. A determining device 48 is additionally also provided, which determines whether the voltage U has been fully shut off. Furthermore, the control device 40 also comprises a characteristic map 50, in which the duration $\Delta t$ required for the closure element 36 to move from the second end position EP2 back into the first end position EP1 under the action of the spring force $F_F$ alone is stored.

By means of the control device 40, it is accordingly possible for a new activation profile to be applied to the coil 30, in the case of which the activation pulse itself, which is made up of the opening current pulse $I_{off}$ and the holding-open current intensity $I_{off}$, is followed by three further phases. These are specifically an interruption phase, in which a reduced current intensity I of for example I=0 prevails, and a phase in which a braking current intensity $I_{Brems}$ is applied and maintained.

By virtue of the phase of the opening current pulse $I_{off}$ being shortened in relation to the prior art, and the activation pulse itself being followed by three further phases, it is possible for the impact speed of the closure element 36 in the two end positions EP1, EP2 to be reduced, and thus for a noise reduction in the actuation of the switching valve 16 to be achieved.

What is claimed is:

1. A method for controlling a pressure dissipation valve for a fuel injection system, wherein the pressure dissipation valve comprises a closure element movable between a first end position blocking a valve opening and a second end position at least partially opening the valve opening, a spring applying a spring force urging the closure element toward the first end position, and an electromagnetic actuator responding to an applied voltage to apply an actuator force to the closure element acting oppositely to the spring force, the method comprising:
    applying a constant voltage to the actuator to induce an opening current pulse until the closure element begins motion counter to the spring force;
    immediately ending the application of the constant voltage upon the beginning of motion of the closure element;
    thereafter, applying a pulsed voltage to the actuator to induce a substantially constant holding-open current intensity;
    maintaining the pulsed voltage for a predetermined duration to hold the closure element in the second end position; and
    interrupting the application of voltage after the predetermined duration, wherein the closure element moves into the first end position as a result of the spring force.

2. The method as claimed in claim 1, wherein the actuator force acting on the closure element owing to the induced current intensity of the opening current pulse is greater in terms of magnitude than the spring force of the spring.

3. The method as claimed in claim 1, wherein the application of voltage is interrupted until an induced current intensity of 0 is attained.

4. The method as claimed in claim 1, further comprising, during the movement of the closure element into the first end position after the interruption of the application of voltage, applying a constant voltage to the actuator to induce a braking current intensity; and
    wherein a duration of the application of voltage for inducing the braking current intensity is shorter than the duration of the application of voltage for inducing the opening current pulse.

5. The method as claimed in claim 4, wherein the actuator force acting on the closure element as a result of the induced braking current intensity is lower than the spring force of the spring.

6. The method as claimed in claim 4, further comprising:
    ending the application of the constant voltage;
    then immediately applying a pulsed voltage to the actuator until such time as the closure element is situated in the first end position; and
    then ending the application of voltage.

7. A control device for a pressure dissipation valve in a fuel injection system, the control device comprising:
    a processor; and
    a memory storing a set of instructions executable by the processor, the set of instruction, when loaded and executed by the processor, programming the processor to:
    apply a constant voltage to an actuator to induce an opening current pulse until a closure element of the pressure dissipation valve begins motion counter to a spring force urging the closure element toward a closed position;
    immediately end the application of the constant voltage upon the beginning of motion the closure element;
    thereafter, apply a pulsed voltage to the actuator to induce a substantially constant holding-open current intensity;
    maintain the pulsed voltage for a predetermined duration to hold the closure element in the second end position; and
    interrupt the application of voltage after the predetermined duration, wherein the closure element moves into the first end position as a result of the spring force.

8. The method as claimed in claim 1, wherein the actuator force acting on the closure element owing to the induced holding-open current intensity substantially corresponds in terms of magnitude to the spring force.

* * * * *